Patented Apr. 24, 1928.

1,667,212

UNITED STATES PATENT OFFICE.

ROGER H. LUECK, OF OAK PARK, ILLINOIS, ASSIGNOR, BY MESNE ASSIGNMENTS, TO THE PUBLIC OF THE UNITED STATES OF AMERICA.

ENAMEL FOR COATING CANS.

No Drawing.   Application filed March 23, 1926.   Serial No. 96,880.

This invention is hereby dedicated to the public for the use of any person in the United States, without the payment by him of any royalty thereon.

The invention relates to the prevention of what is known as "corn black" and similar discoloration of corn and certain other canned food. This discoloration is believed to arise from the forming of compounds of sulphur with the metal or metals of the can, and is prevented by providing zinc oxide, or the oxide of another metal suitable for the purpose, with which the sulphur will combine to form a colorless or light colored compound in preference to forming the above mentioned, black or dark compound.

In producing an enamel for the purpose of containing the zinc or other suitable oxide, serious difficulties have been encountered from the livering or jellying of the enamel, so that its fluidity is lost and it is not capable of being properly applied to the tin surfaces, which may be the surfaces of the tin plate before it is cut and made up into cans or which may be the interior surfaces of the finished can.

This difficulty is encountered in endeavoring to form this enamel from most of the gums or varnishes in common use, and it is not now a commercial possibility to find a gum or varnish which can always be reliably used as the principal component of the enamel.

Most of the gums or varnishes from which enamel is to be made contain sufficient acid to interfere with the proper combination therewith of the zinc oxide, because of, as I believe, the formation of zinc soaps by the aid of the acid, which interfere both with the fluidity of the enamel and the desired action of the zinc oxide in forming light colored sulphide.

I have overcome this difficulty by using gums or varnishes which are free from acid or extremely low in acidity, so that the acid value of the gum and of the varnish or lacquer is very close to zero. When a natural gum of this kind cannot be obtained, neutralize it in a suitable manner, as by the addition to the melted gum of glycerine with a catalyst such as metallic zinc.

I further discovered that the introduction of lead into the lacquer, which may occur from the use of an ordinary drier containing lead, interferes very much with the desired result and allows the formation of dark colored sulphide.

My improved enamel may, according to the above discoveries, consist of a substantially oleo-resin varnish, substantially free from lead, and having incorporated therein an insoluble metallic compound of such metal or metals which form sulphides that are not dark colored, such a metallic compound being preferably an oxide of zinc.

The enamel may be prepared according to any suitable process, as by melting together the resinous gums to be used and adding thereto vegetable oil and a metallic drier substantially free from lead, and adding a volatile solvent to regulate viscosity to the desired point, this lacquer being neutralized as by the addition of glycerine and metallic zinc, and then adding the zinc oxide and thoroughly incorporating it in the mixture to form an enamel, which is applied to the interior of cans and baked thereon at a relatively high temperature suitable for such baking.

To make this enamel I have had the varnish maker produce for me an oleo-resin varnish substantially neutral and free from lead made of hard and soft fossil gums, vegetable oils, mineral turpentine and manganese resinate and with this varnish I mix a zinc oxide paste made of finely divided precipitated zinc oxide, or zinc oxide of minimum opacity, first ground in the above varnish and Perilla oil to the proportions of one to twelve and a half pounds paste to five gallons of the above mentioned varnish. Said zinc oxide was forty per cent, by weight, of said paste.

I claim:

1. An enamel for coating cans which are to contain food products, consisting of a substantially neutral oleo-resin varnish substantially free from lead and having incorporated therein an insoluble metallic compound of such metal or metals forming sulphides which are not dark colored, so that said compound is permanently embodied in the enamel and held in place on the inside of the container during processing and subsequent thereto.

2. A can for the packing of food products having its interior surface coated with an enamel, consisting of a substantially neutral oleo-resin varnish substantially free from lead and having incorporated therein an insoluble metallic compound of such metal or metals forming sulphides which are not dark colored, so that said compound is permanently embodied in the enamel and held in place on the inside of the container during processing and subsequent thereto.

In testimony whereof I affix my signature.
ROGER H. LUECK.
[L. S.]        AMERICAN CAN COMPANY,
*Assignee and Dedicator.*
By CHARLES STOLLBERG,
*Vice-Pres.*

Attest—
R. H. ISMON,
*Sec'y.*